United States Patent [19]

Griesinger

[11] Patent Number: 4,648,242
[45] Date of Patent: Mar. 10, 1987

[54] APPARATUS FOR PROVIDING A CONSTANT FUEL CONSUMPTION RATE FOR A FUEL POWERED TURBINE

[75] Inventor: Robert E. Griesinger, Orinda, Calif.

[73] Assignee: Williams & Lane Energy Systems Corporation, Benicia, Calif.

[21] Appl. No.: 758,053

[22] Filed: Jul. 23, 1985

[51] Int. Cl.$^4$ .............................................. F02C 9/40
[52] U.S. Cl. ................................. 60/39.03; 60/39.281
[58] Field of Search .............. 60/39.03, 39.281, 39.465

[56] References Cited

U.S. PATENT DOCUMENTS

| | | | |
|---|---|---|---|
| 2,971,337 | 2/1961 | Wintrode | 60/39.281 |
| 3,187,504 | 6/1965 | Herbert et al. | 60/39.281 |
| 3,664,124 | 5/1972 | Fehler | 60/39.281 |
| 4,117,670 | 10/1978 | Dombkowski et al. | 60/39.281 |
| 4,219,738 | 8/1980 | Griesinger | 60/39.281 |

Primary Examiner—Louis J. Casaregola
Attorney, Agent, or Firm—Robert B. Chickering; Glen R. Grunewald

[57] ABSTRACT

The apparatus of the present invention is designed for use with a source of natural gas which is substandard in that its BTU content is inconstant. The apparatus includes a fuel powered turbine engine having an air compressor section, a combustion section and a power turbine section which is connected to drive an electric generator which in turn is adapted for connection to the infinite bus of the local electric power distribution system for cogeneration of electric power. This is accomplished by an electronic circuit which senses the compressor inlet temperature (CIT) and the turbine inlet temperature (TIT) and automatically feeds the available substandard gas to the turbine engine in a manner maintaining a constant energy flow.

10 Claims, 2 Drawing Figures

APPARATUS FOR PROVIDING A CONSTANT FUEL CONSUMPTION RATE FOR A FUEL POWERED TURBINE

BACKGROUND OF THE INVENTION

The invention relates to apparatus used for controlling the function of a fuel powered turbine engine having an air compressor section, a combustion section and a power turbine section. An example of such an apparatus is disclosed and claimed in my earlier U.S. Pat. No. 4,219,738.

There are a number of natural gas wells which lie dormant and unused because their product, i.e., the natural gas, is substandard in that its BTU content is inconstant, and therefore cannot be sold to the local natural gas utility for distribution in its lines and mixed with its gas of standard consistent quality. Accordingly these wells despite the energy demand have remained unused and of little or no commerical value.

SUMMARY OF THE INVENTION

Applicant has found that in a fuel powered turbine of the type to which the present invention relates, a constant value of energy flow may be expressed as a constant turbine inlet temperature (TIT) plus a function of compressor inlet temperature (CIT) typically a constant value of TIT plus a linear function of CIT. In some instances constant energy flow may be expressed as a constant value of TIT plus some non-linear function of CIT (perhaps a logarithmic function, or a square root or other function). In accordance with the present invention proper control may still be effected by making one of the components, as hereinafter more fully explained, a logarithmic amplifier or a square root type amplifier as the case may be. Stated in other terms applicant has found that for a constant energy flow, changes in CIT need be accompanied by a prescribed change in TIT, and for different energy rates the relationship (constant) will change. Another way of stating this important relationship is $TIT = A + (C \times CIT)$, where A and C are constants for selected energy consumption rates. For example, at 35,000,000 BTU/hour $TIT = 1509 + 2.5993 \cdot CIT$, see FIG. 2 of the Drawings. In brief the apparatus of the present invention senses the compressor section inlet temperature and the turbine section inlet temperature and modulates the opening and closing of a fuel valve to maintain a constant energy consumption rate.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

DETAILED DESCRIPTION OF THE INVENTION

Figure 1:
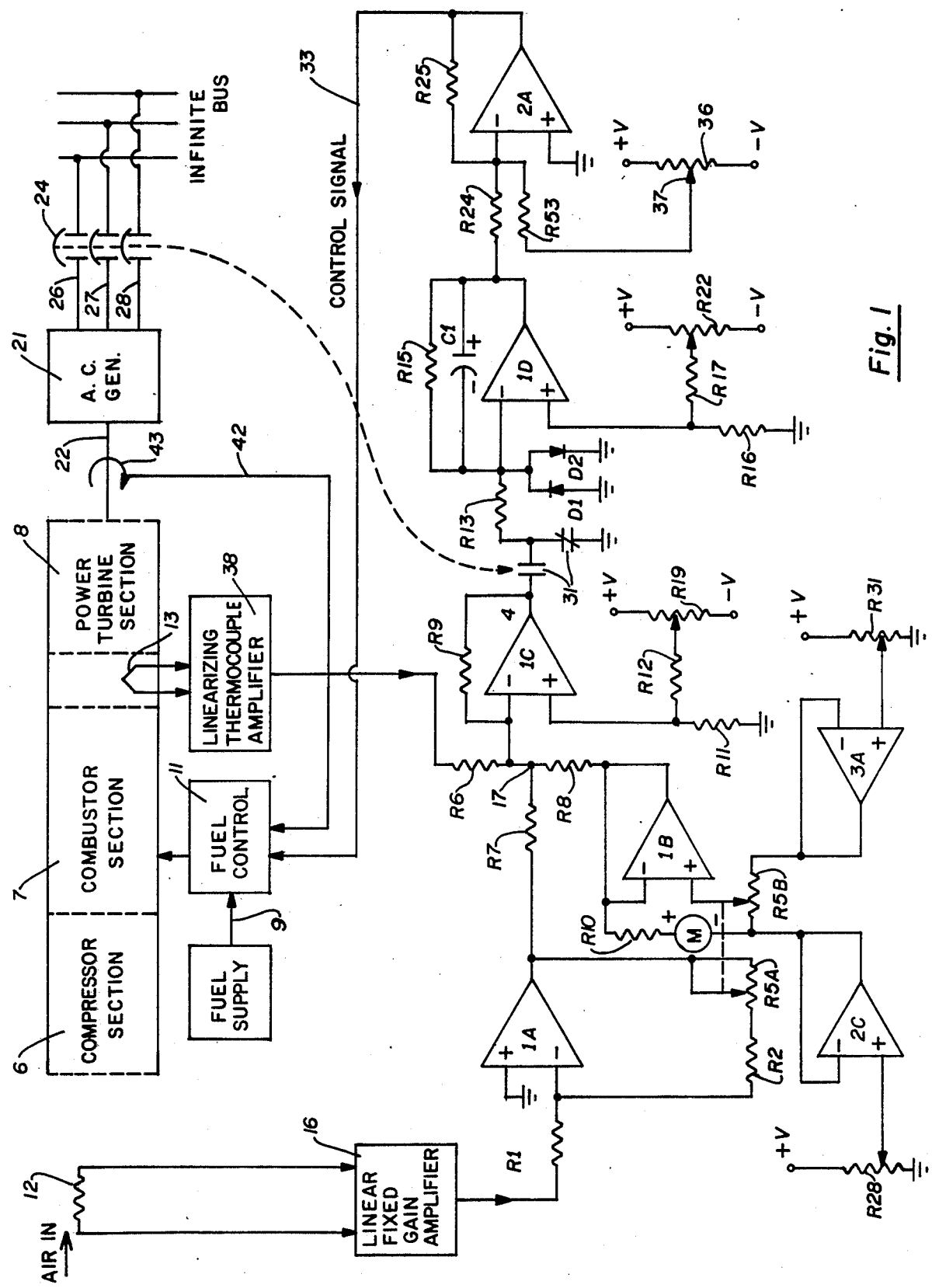
FIG. 1 is a set schematic diagram of the apparatus of the present invention.

The apparatus of the present invention is designed to provide a constant energy consumption rate for a fuel powered turbine engine having an air compressor section 6, a combustion section 7, and a power turbine section 8, a fuel supply line 9 connected to combustion section 7 and a fuel control 11 mounted in the fuel supply line. The invention comprises briefly a first means 12 for sensing the compressor section inlet temperature, i.e., the temperature of the air labeled "air in" on the drawing and generating a first signal representative thereof: second means 13 for sensing the power turbine section inlet temperature and generating a second signal representative thereof, and third means, constituting the balance of the electronic circuit, which is connected to the first and second means and the fuel control and is responsive to the compressor inlet temperature, herein abbreviated CIT, and turbine inlet temperature, herein abbreviated TIT, for modulating the opening and closing of fuel control 11 to maintain a constant energy consumption rate in accordance with the formula:

$$\Delta TIT / \Delta CIT = C$$

where C is a constant corresponding to a constant energy consumption rate. This relationship results graphically in a straight line, see FIG. 2, with different constant energy consumption rates assuming different positions on the chart. They are all straight lines and generally run in the same directions but are not quite parallel. The several lines shown represent constant energy consumption rates for a typical gas turbine engine. The relationship between TIT and CIT also may be expressed by the formula:

$$TIT = A + (B \times CIT)$$

where A and C are constants for different constant energy consumption rates. For example at 35,000,000 BTU/hr, $TIT = 1509 + 2.5993 \ CIT$ whereas at 30,000,000 BTU/hr, $TIT = 1388 + 2.3286 CIT$. Other constant consumption rates are shown with their respective constants in FIG. 2. As will be observed from FIG. 2 an incremental increase in CIT will cause the present apparatus to modulate fuel control 11 to produce an incremental increase in TIT such as to hold the BTU/hr consumption of the energy constant. The present apparatus thus controls the fuel consumption rate keeping it constant with varying CIT, fuel BTU content and TIT.

Sensor 12 is connected to a linear fixed gain amplifier 16, the output of which is connected through resistor R1 to the negative input of operational amplifier 1A. The latter is operated as a variable gain amplifier, the gain of which is set to that value of linear gain as required to agree with the selected energy flow. The output of amplifier 1A is connected by resistor R7 to summing junction 17. The amount of gain of amplifier 1A is controlled by potentiometer R5A in its feedback loop which also contains a fixed resistor R2. Also connected to junction 17 via resistor R8 is a reference voltage received from operational amplifier 1B which in turn has its + input connected to the wiper arm of potentiometer R5B which is connected across the outputs of two operational amplifiers 2C and 3A which have their + inputs connected to the wiper arms of potentiometers R28 and R31. The latter are connected between + voltage and ground and thus sets the voltage drop across potentiometer 5B. As an important feature of this structure the wiper arms of potentiometers 5A and 5B are ganged so that the gain of amplifier 1A and the output of amplifier 1B are varied together so as to provide the constants discussed in the foregoing, thus permiting adjustment of operation of the turbine from one level to another while maintaining a constant energy consumption rate at each level. Advantage is taken of this configuration to connect one side of a Meter M via resistor R10 to the output of amplifier 1B and the other side of the meter to the output of amplifier 2C. The meter thus connected will accurately reflect the energy consumption rate. This meter may be calibrated to read 20 corresponding with 20,000,000 BTU/hr, 25, 30, 35, 40, 50 etc. Changing from one energy level to the other may be accomplished by a joint movement of the wipers of potentiometers R5A and R5B.

Sensor 13, here a thermocouple, is connected to summing junction 17 through resistor R6 and a linearizing thermocouple amplifier 38. Summing junction 17 is also connected to the negative input of operational amplifier 1C which provides a control signal for modulating fuel control 11. Resistor R9 is connected in the feedback loop of amplifier 1C, and the positive input of amplifier 1C is connected to ground through resistor R11 and to a fixed voltage through resistor R12 connected to the wiper arm of potentiometer R19, which is connected between + and − reference voltages.

As hereinabove noted, the apparatus shown in FIG. 1 includes an electric generator 21 which is connected by drive shaft 22 for driving by the power turbine section and which develops electric power designed for connection to the local utility lines, commonly referred to as the infinite bus, for generation of electric power. The balance of the circuitry shown in FIG. 1 is to provide for convenient startup operations of the gas turbine engine preparatory to connection of the generator to the infinite bus, and then to provide the smooth taking over by the automatic fuel control to provide a predetermined level of constant energy consumption rate.

As here shown, the circuitry is broken at two points, one by circuit breaker 24 mounted in the output lines 26, 27 and 28 of generator 21 so as to open and close the connection of the generator to the infinite bus. When circuit breaker 24 is open the generator will operate under a no load condition. Auxiliary contacts 31 of circuit breaker 24 are connected to the output of operational amplifier 1C so that when circuit breaker 24 is open the automatic portion of the circuitry is disconnected from the fuel control. One part of auxiliary contacts 31 is connected through resistor R13 to the negative input terminal of operational amplifier 1D which is here configured as a quasi integrator. Another part of auxiliary contacts 31 which is closed in the open position of circuit breaker 24, connects resistor R13 to ground. Accordingly when circuit breaker 24 is open, the output of amplifier 1C is disconnected from resistor R13 and resistor R13 is grounded so that amplifier 1D receives no signal from 1C. The input to amplifier 1D is zero and the output of this amplifier is zero. Potentiometer R22 permits a perfect adjustment of this, correcting for the imperfectness of amplifier 1D. This function is called an "offset adjustment". The foregoing may also be said for potentiometer R19 which is used to adjust amplifier 1C. When circuit breaker 24 is closed, the auxiliary contacts transfer position so that resistor R13 is no longer grounded but receives the signal from amplifier 1C and the controller begins its corrective, controlling action. As will be noted, resistor R15 and capacitor C1 are included in the feedback loop of amplifier 1D.

The function of capacitor C1 and resistor R15 is to "soften" the system response when the automatic portion of the circuit takes over. For example, at a CIT of 70° F., the unloaded turbine TIT is somewhere in the order of 1100° F. Assuming a desire to control the fuel flow at 40,000,000 BTU/hr, and 70° F. CIT calls for a TIT of about 1831° F. (FIG. 2), a difference of 731° F. In the present circuit there is an equivalent input of 0.731 volts into amplifier 1C and an output of 0.731×33.2/10=2.43 volts. Without capacitor C1, when the automatic section of the system takes over, the output of amplifier 1C would be 2.43 volts×499/10 or 121.1 volts. It is however limited by the supply voltage of 10 volts and goes (if it could) instantly to about 9 volts subjecting the entire system to a tremendous and unnecessary "step" change. R15 could be reduced but the system needs sufficient loop gain so as to reduce errors to insignificance. Capacitor C1 is thus employed as a softening device.

Figure 2:
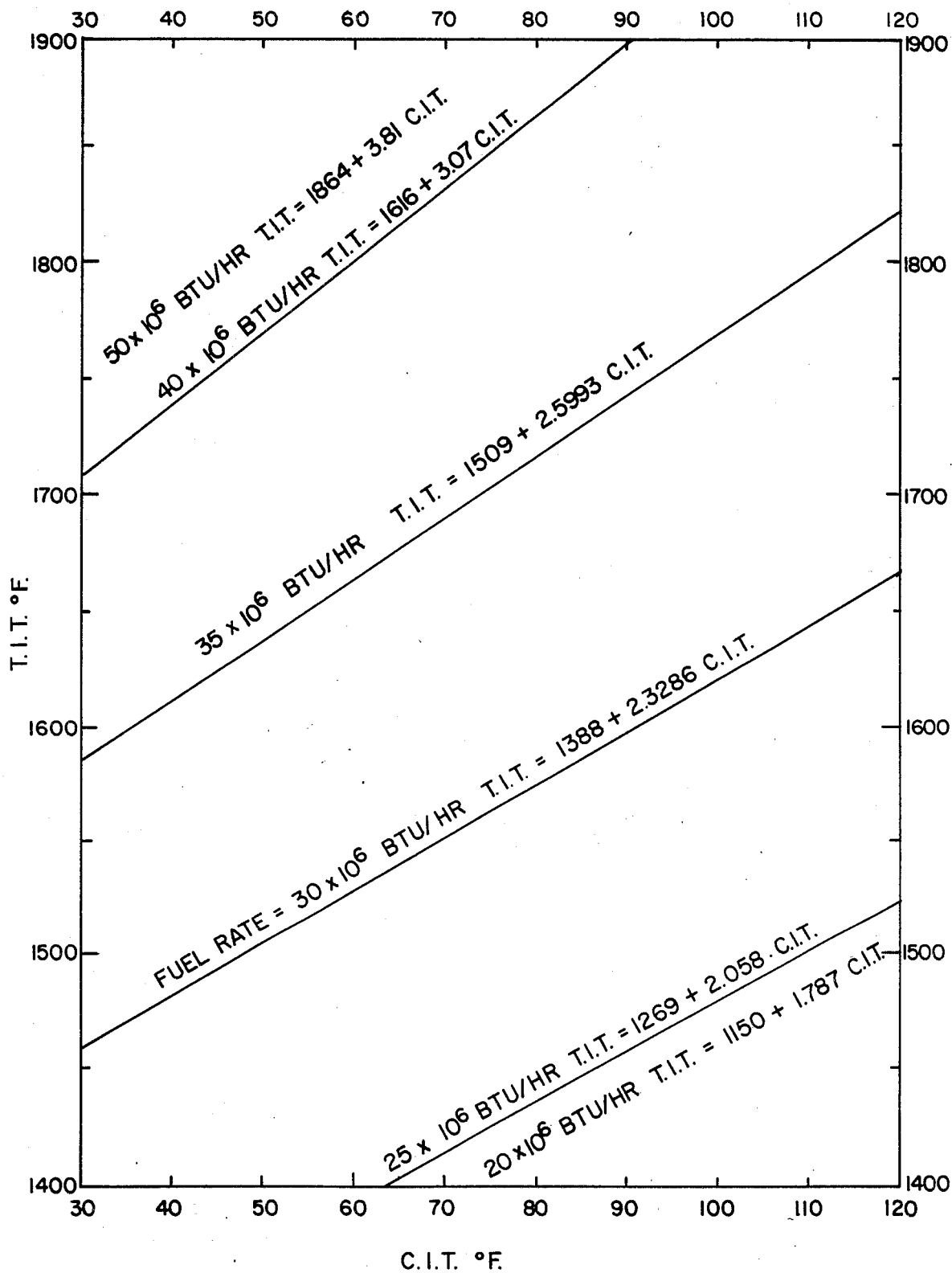
FIG. 2 shows the relationship between TIT and CIT for different constant fuel consumption rates.

Using the above numbers, 1100° F. and 1831° F. etc., the input of amplifier 1D gets "hit" with 2.43 volts and the output of amplifier 1D changes at a fairly rapid rate. The unit delivers power and TIT goes up from 1100° F. When this happens, the error input to amplifier 1C decreases and its output decreases. The input to amplifier 1D is less and the output changes at a lesser rate. This corrective process continues until the unit loads up smoothly without a large steplike initial shock to the final controlled value. Preferably the fuel control itself can be adjusted to limit the maximum value of TIT, typically to about 1900° F. for continuous operation and somewhat more for intermittent operation. Since the upper control limit is built within the fuel control valve, the system's call for a higher temperature may be disregarded and an alarm provided to advise such a condition as being in excess of the system's capabilities. The range of the chart in FIG. 2 is somewhat arbitrary and could of course show the constant energy consumption rates for a wider range of temperatures both CIT and TIT using the formulas shown in FIG. 2.

The means for setting the fuel rate needed to maintain synchronous speed of a generator to match the infinite bus with the generator running at no load is located immediately following operational amplifier 1D and consists of operational amplifier 2A, resistor R53 and speed set potentiometer 36. The output of amplifier 2A is connected to the fuel control 11, and resistor R25 is included in a feedback loop for amplifier 2A. The output of amplifier 2A is controlled by a potentiometer 36 which provides a variable fixed voltage to its wiper 37 which is in turn connected through resistor R53 to the negative input of amplifier 2A. At the outset of operations circuit breaker 24 and auxiliary contacts 31 are configured as shown so that the gas turbine engine is under the control of speed setting potentiometer 36, with the generator running at no load. When synchronism is achieved, circuit breaker 24 is closed and auxiliary contacts reverse configuration to place the engine under automatic constant energy rate control as above described.

In summary, considering the operating formula $TIT = A + (B \times CIT)$, variable resistor R5B sets the constant A while variable resistor R5A sets the constant B. Since these two resistors are potentiometers which are ganged for joint movement a means is provided for readily moving from one energy consumption rate to another as depicted in the showing of FIG. 2.

Operational amplifier 1A is configured as a variable gain amplifier. Operational amplifier 1B is configured as a fixed gain amplifier with a gain of 1. Operational amplifier 1C is configured as a summer. Operational amplifier 1D is configured as a quasi-integrator; most of the required system gain being obtained from operational amplifier 1D. Operational amplifier 2A is configured as a summer.

Diodes D1 and D2 connected between the negative input of operational amplifier 1D to ground are for protective purposes.

The wiper arms of potentiometers R19 and R22 are adjusted to provide for zero out for zero in. This is a one time adjustment. Potentiometers R28 and R31 are similarly set to provide fixed reference voltage and need only a one time adjustment.

The CIT sensor, resistor 12, is typically linear and hence its variation with temperature may be handled by a linear fixed gain amplifier 16 as shown. The TIT sensor is typically a thermocouple which does not provide a linear response with a change in temperature and hence is connected to a linearizing thermocouple amplifier 38 well known in the art.

The heat in the discharge of the power turbine section may be used for general heating purposes e.g., warming of a building, drying of farm produce, etc.

Fuel control 11 is well known in the art for various adaptations of a gas fired turbine engine and is not claimed per se. For a better understanding of the present invention, in which the fuel control is one of the elements of the combination claimed, a brief description of the fuel control follows. This unit typically consists of a number of components including a fuel valve and electronic circuitry having a signal input by conductor 33 from speedset potentiometer 36, representing a desired speed, and an actual speed signal of opposite polarity by conductor 42 from a speed pickup 43 on the turbine itself. The electronic circuit compares the desired speed signal with the actual speed signal and provides an output signal to the fuel valve so that the actual speed is made equal to the desired speed. In this mode the apparatus is not in a fuel rate control mode, but a speed control mode. When the two above signals are equal the net input to the electronic circuit is zero and corrective action to the fuel valve is discontinued and speed is maintained status quo, as to fuel flow. However the fuel flow must be increased to generate power. This is accomplished by the use of another signal input to the fuel control which is proportional to generator kilowatt output and is of a polarity opposite that of the speed signal. The circuit breaker is closed but no net power is produced as the system is satisfied. If the speedset signal is increased, the system is upset and calls for more fuel which will provide a generator power output. The kilowatt signal develops cancelling out the increase in the set speed signal, and the system regains balance generating a stable value of output power. All of the above is well known and is commonly referred to as the "droop mode" of operation and is known to be necessary when paralleling with and controlling power output following the above described operations.

With the apparatus of the present invention the kilowatt signal is not required and so is not used. The system is first satisfied at synchronous speed and in synchronism with speedset 36 which then sends its signal to the fuel control circuit as above described. When circuit breaker 24 is closed, amplifier 1D upsets the system by supplying a control signal via conductor 33 to the electronic circuit in the fuel control. With this upset, the circuit calls for more fuel and sends a "more fuel" signal to the fuel control which responds accordingly. With more fuel, kilowatts are produced at the expense of increasing TIT. Summing amplifier 1C sees this and responds with a reduced output. Amplifier 1D has no choice but to follow. This process continues until amplifier 1C sees that TIT is what it should be and gives a zero output. We now have a zero signal from amplifier 1D and to resistor R24 and the only contribution into amplifier 2A is what was heretofore present from speedset 36. But we have a kilowatt output, a new value of TIT, and most importantly a known, set, energy rate which will be of a constant value.

The invention claimed is:

1. Apparatus for providing a constant energy consumption rate for a fuel powered turbine engine having an air compressor section, a combustion section and a power turbine section, a fuel supply line connected to said combustion section and a fuel control mounted in said fuel supply line, comprising:
   first means for sensing the compressor section inlet temperature (CIT) and generating a first signal representative thereof;
   second means for sensing the power turbine section inlet temperature (TIT) and generating a second signal representative thereof;
   third means connected to said first means, said second means and said fuel control and being responsive to said CIT and said TIT for modulating said fuel control to maintain a constant energy consumption rate in accordance with the formula:

$$\Delta TIT/\Delta CIT = C$$

where C is a constant corresponding to a constant fuel consumption rate; and
   fourth means for controlling the value of C for thereby controlling said energy consumption rate.

2. The apparatus of claim 1, said third means comprising:
   a summer;
   a variable gain amplifier connecting said first means to the input of said summer;
   a first variable resistor for controlling the gain of said amplifier;
   said second means being connected to said summer input;
   a second variable resistor providing a variable fixed reference voltage connected to said summer input and ganged with said first variable resistor for simultaneous change of said first and second variable resistors; and
   the output of said summer being connected to said fuel control for controlling the fuel flow rate to said combustion section.

3. The apparatus of claim 2, and
   a meter connected between said summer input and said second variable resistor and providing a reading of said energy consumption rate.

4. The apparatus of claim 2, said summer comprising:
   a summing junction;
   an operational amplifier connected between said junction and said fuel control and having a feedback loop; and
   a resistor connected in said feedback loop.

5. The apparatus of claim 2, said summer comprising:
a summing junction;
a first operational amplifier having an input connected to said junction;
a first resistor connected to and between said junction and the output of said variable gain amplifier;
a second operational amplifier having an input connected to said second variable resistor;
a second resistor connecting the output of said second operational amplifier to said junction;
a linearizing amplifier having an input connected to said second means; and
a third resistor connected to and between the output of said last name amplifier and said junction.

6. The aparatus of claim 1, and
an electric generator connected to and driven by said power turbine section and adapted for connection to a utility infinite bus for cogeneration of electric power; and
synchronizer means connected to said fuel valve for initially setting the voltage, frequency and phase of said generator to correspond with the voltage, frequency and phase of said power grid.

7. The apparatus of claim 5, said first means comprising:
a resistor sensing CIT;
a linear fixed gain amplifier having an input connected to said last named resistor and an output connected to an input of said variable gain amplifier; and
said second means comprising a thermocouple and a linearizing amplifier therefor connected to the input of said first named operational amplifier.

8. The apparatus of claim 1, and
said third means being responsive to said first and second means for modulating said fuel control to maintain a continuous relationship between said CIT and said TIT defined by the formula:

$$TIT = A + (C \times CIT)$$

where A and B are constants for selected energy consumption rates.

9. The apparatus of claim 6:
a circuit breaker interposed between the output of said generator and said bus;
circuit breaker auxiliary contacts interposed between the output of said variable gain amplifier and said fuel control;
the circuit between said circuit breaker auxiliary contacts and said fuel control comprising:
a fourth operational amplifier having an input connected to said circuit breaker auxiliary contacts and an output connected to said fuel control, said fourth amplifier having a feedback loop;
a resistor in said loop;
a capacitor connected across said last named resistor and cofunctioning therewith to soften the system response on transfer of said circuit breaker auxiliary contacts;
a fifth operational amplifier having an input connected to the output of said fourth operational amplifier and an output connected to said fuel control; and
means providing a variable fixed voltage connected to said last named input and functioning to set the fuel rate needed to maintain synchronous speed of said generator to match said infinite bus with said generator running at no load, before closing said circuit breakers.

10. A method for providing a constant energy input to a fuel powered turbine engine having an air compressor section, a combustion section and a power turbine section, a fuel supply line connected to said combustion section and a fuel control mounted in said fuel supply line, said method comprising the steps of:
sensing the compressor section inlet temperature (CIT) and generating a first signal representative thereof;
sensing the power turbine section inlet temperature (TIT) and generating a second signal representative thereof;
modulating said fuel control in response to said signals, to maintain the relationship;

$$\Delta TIT / \Delta CIT = C$$

where C is a constant corresponding to said constant energy input; and
controlling the value of C for thereby controlling said constant energy flow.

* * * * *